United States Patent
Furukawa et al.

(10) Patent No.: US 11,170,941 B2
(45) Date of Patent: Nov. 9, 2021

(54) SOLID ELECTROLYTIC CAPACITOR

(71) Applicant: Murata Manufacturing Co., Ltd., Nagaokakyo (JP)

(72) Inventors: Takeshi Furukawa, Nagaokakyo (JP); Sachiko Shirakawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/815,297

(22) Filed: Mar. 11, 2020

(65) Prior Publication Data

US 2020/0303131 A1     Sep. 24, 2020

(30) Foreign Application Priority Data

Mar. 22, 2019  (JP) .............................. JP2019-054615

(51) Int. Cl.
   *H01G 9/10*    (2006.01)
   *H01G 9/15*    (2006.01)
   *H01G 9/00*    (2006.01)
   *H01G 9/07*    (2006.01)
   *H01G 9/055*   (2006.01)

(52) U.S. Cl.
   CPC ............. *H01G 9/15* (2013.01); *H01G 9/0036* (2013.01); *H01G 9/055* (2013.01); *H01G 9/07* (2013.01); *H01G 9/10* (2013.01)

(58) Field of Classification Search
   None
   See application file for complete search history.

(56) References Cited

U.S. PATENT DOCUMENTS

| 6,392,869 B2 | 5/2002 | Shiraishi et al. |
| 6,563,693 B2 * | 5/2003 | Nakada ................. H01G 9/012 361/523 |
| 7,385,804 B2 * | 6/2008 | Kuriyama ............. H01G 9/012 361/532 |
| 2002/0001169 A1 | 1/2002 | Shiraishi et al. |

(Continued)

FOREIGN PATENT DOCUMENTS

| CN | 101162654 A | 4/2008 |
| JP | H05101989 A | 4/1993 |

(Continued)

OTHER PUBLICATIONS

Chinese Office Action issued for Chinese Application No. 202010179353.8, dated Aug. 3, 2021.

*Primary Examiner* — Dion Ferguson
(74) *Attorney, Agent, or Firm* — Arent Fox LLP

(57) ABSTRACT

A solid electrolytic capacitor that includes a capacitor element laminate, a first external electrode, and a second external electrode. The capacitor element laminate includes capacitor elements, cathode lead-out layers, and a sealing body. At least one of the capacitor elements includes an anode foil, dielectric layers, and cathode layers. The first external electrode is connected to the anode foil exposed at the first end surface of the capacitor element laminate. The second external electrode is connected to the cathode lead-out layers exposed at the second end surface of the capacitor element laminate. The sealing body includes a first resin molded body and a second resin molded body. The first resin molded body and the second resin molded body are made of the same insulating material.

14 Claims, 11 Drawing Sheets

(56) References Cited

U.S. PATENT DOCUMENTS

| | | | |
|---|---|---|---|
| 2004/0027789 A1* | 2/2004 | Kochi | H01G 9/15 361/523 |
| 2007/0279841 A1 | 12/2007 | Kim et al. | |
| 2007/0297121 A1* | 12/2007 | Yoshida | H01G 9/012 361/523 |
| 2008/0089014 A1 | 4/2008 | Ishizuka et al. | |
| 2008/0304210 A1* | 12/2008 | Kasuga | H01G 9/14 361/528 |
| 2009/0089990 A1 | 4/2009 | Kawakubu et al. | |
| 2010/0165547 A1* | 7/2010 | Kuranuki | H01G 9/15 361/525 |
| 2012/0125674 A1* | 5/2012 | Miyahara | H01G 11/04 174/260 |
| 2013/0100586 A1* | 4/2013 | Kitayama | H01G 9/14 361/532 |
| 2017/0040117 A1 | 2/2017 | Shin et al. | |
| 2017/0140877 A1* | 5/2017 | Kuromi | H01G 9/10 |
| 2017/0287647 A1* | 10/2017 | Nobuta | H01G 9/012 |
| 2017/0365419 A1* | 12/2017 | Demizu | H01G 9/012 |
| 2019/0006115 A1* | 1/2019 | Uher | H01G 9/15 |
| 2019/0237266 A1 | 8/2019 | Tsutsumi | |
| 2019/0244765 A1 | 8/2019 | Harada et al. | |
| 2020/0211784 A1* | 7/2020 | Tamatani | H01G 9/045 |
| 2020/0273628 A1 | 8/2020 | Suzuki et al. | |
| 2020/0303130 A1* | 9/2020 | Furukawa | H01G 9/048 |
| 2020/0303131 A1 | 9/2020 | Furukawa et al. | |

FOREIGN PATENT DOCUMENTS

| | | |
|---|---|---|
| JP | 2002319522 A | 10/2002 |
| JP | 2003086459 A | 3/2003 |
| JP | 2007180160 A | 7/2007 |
| JP | 2008078312 A | 4/2008 |
| WO | 2018074407 A1 | 4/2018 |
| WO | 2018074408 A1 | 4/2018 |

* cited by examiner

×500　　　　　— 10μm

×1000　　　　　— 10μm

×500

×1000

SOLID ELECTROLYTIC CAPACITOR

CROSS REFERENCE TO RELATED APPLICATIONS

The present application claims priority to Japanese Patent Application No. 2019-054615, filed Mar. 22, 2019, the entire content of which is incorporated herein by reference.

FIELD OF THE INVENTION

The present invention relates to a solid electrolytic capacitor.

BACKGROUND OF THE INVENTION

Patent Literature 1 (JP 2007-180160 A) discloses a method of producing a capacitor chip (multilayer solid electrolytic capacitor) by enclosing a capacitor element laminate in resin. Patent Literature 1 aims to provide a technique that increases the range of the total allowable thickness of laminated capacitor elements to increase the capacitance, without causing poor appearance in the multilayer solid electrolytic capacitor.

Patent Literature 2 (WO 2018/074408) discloses a solid electrolytic capacitor including a laminate of multiple units each including a valve-action metal substrate having a porous layer on a surface, a dielectric layer on a surface of the porous layer, and a solid electrolyte layer on the dielectric layer. In the solid electrolytic capacitor disclosed in Patent Literature 2, a conductor layer is provided between the units, at least one of the conductor layers includes a metal foil, the units and the conductor layers are enclosed in an exterior resin, an anode side-end surface of the valve-action metal substrate is directly connected to an anode external electrode provided on a surface of the exterior resin at one end surface of the solid electrolytic capacitor, and the metal foil is directly connected to a cathode external electrode provided on the surface of the exterior resin at the other end surface of the solid electrolytic capacitor.

SUMMARY OF THE INVENTION

Patent Literature 1 states that the capacitor elements are preferably laminated on one or both sides of a lead frame. Yet, when the lead frame that does not contribute to capacitor characteristics is provided in the sealing resin, it is disadvantageous in terms of volume capacity density of the device as a whole.

Patent Literature 2 discloses a structure including a current collecting structure that uses a metal foil, wherein an anode and a cathode of the capacitor element are directly led out to external electrodes, without using a lead frame or substrate in an exterior resin. When the area occupied by capacitor elements in such a structure is maximized, cracking may occur due to strain caused by the difference in linear expansion coefficient between the capacitor elements and the exterior resin, adversely affecting the reliability.

The present invention is made to solve the above problem, and aims to provide a highly reliable solid electrolytic capacitor in which cracking to a resin molded body from stress caused by thermal stress can be reduced or prevented while the volume occupied by the capacitor elements is increased.

The solid electrolytic capacitor of the present invention includes a capacitor element laminate, a first external electrode at a first end surface of the capacitor element laminate, and a second external electrode at a second end surface of the capacitor element laminate. The capacitor element laminate includes capacitor elements, cathode lead-out layers, and a sealing body enclosing the capacitor elements and the cathode lead-out layers. At least one of the capacitor elements includes an anode foil made of a valve-action metal, dielectric layers on opposed surfaces of the anode foil, and cathode layers including a solid electrolyte layer on surfaces of each of the dielectric layers. The cathode layers are connected to respective cathode lead-out layers. The first external electrode is connected to the anode foil exposed at the first end surface of the capacitor element laminate. The second external electrode is respective connected to the cathode lead-out layers exposed at the second end surface of the capacitor element laminate. The sealing body includes a first resin molded body and a second resin molded body. The first resin molded body encloses the capacitor elements and the cathode lead-out layers from a first main surface side of the capacitor element laminate so as to define at least the first main surface of the capacitor element laminate. The second resin molded body encloses the capacitor elements and the cathode lead-out layers from a second main surface side of the capacitor element laminate so as to define at least the second main surface of the capacitor element laminate. The first resin molded body and the second resin molded body are made of the same insulating material.

The present invention provides a highly reliable solid electrolytic capacitor in which cracking to a resin molded body from stress caused by thermal stress can be reduced or prevented while the volume occupied by the capacitor elements is increased.

DETAILED DESCRIPTION OF THE PREFERRED EMBODIMENTS

The solid electrolytic capacitor of the present invention is described below.

The present invention is not limited to the following preferred embodiments, and may be suitably modified without departing from the gist of the present invention. Combinations of two or more preferred features described in the following preferred features are also within the scope of the present invention.

In the solid electrolytic capacitor of the present invention, a sealing body includes a first resin molded body that encloses capacitor elements and cathode lead-out layers from a first main surface side of a capacitor element laminate so as to define at least the first main surface of the capacitor element laminate, and a second resin molded body that encloses the capacitor elements and the cathode lead-out layers from a second main surface side of the capacitor element laminate so as to define at least the second main surface of the capacitor element laminate. The first resin molded body and the second resin molded body are made of the same insulating material.

The capacitor elements and the cathode lead-out layers are enclosed from the upper and lower sides by the resin molded bodies that are made of the same insulating material. Thus, even when the volume occupied by the capacitor elements is increased, cracking of the resin molded bodies due to stress caused by thermal stress can be reduced or prevented. This increases the reliability of the solid electrolytic capacitor.

As used herein, the "same insulating material" includes not only insulating materials that are completely the same with the completely same composition but also insulating materials that are substantially the same. The "insulating materials that are substantially the same" include insulating materials that do not have completely the same composition but have substantially the same characteristics and/or properties. Examples include an insulating material in which the balance of components of filler is slightly different and an insulating material in which the main resin is the same but one or more crosslinking components are different.

Figure 1:
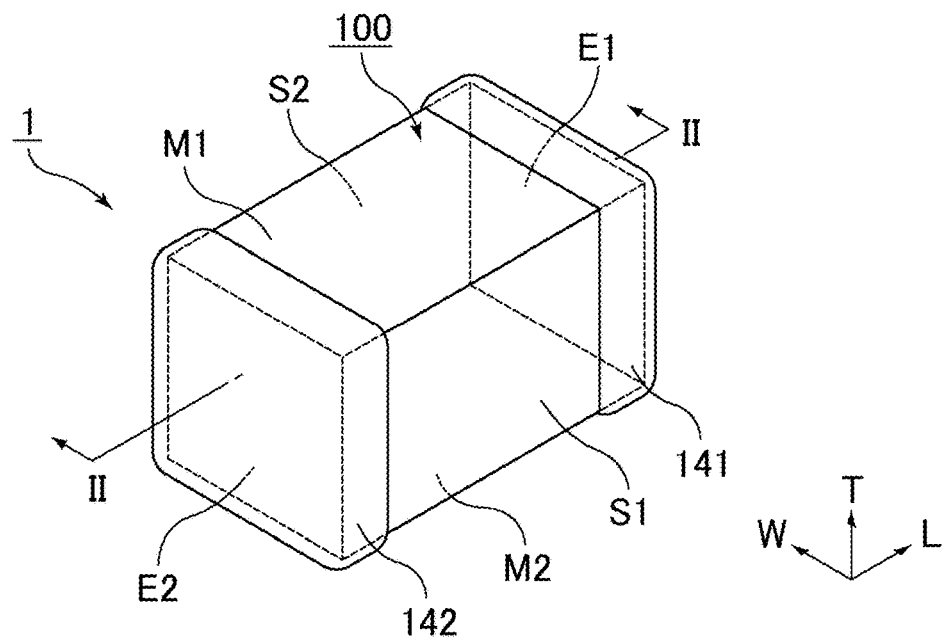
FIG. 1 is a schematic perspective view of an example of a solid electrolytic capacitor of the present invention.

FIG. 1 is a schematic perspective view of an example of a solid electrolytic capacitor of the present invention.

A solid electrolytic capacitor 1 shown in FIG. 1 includes a capacitor element laminate 100, a first external electrode 141, and a second external electrode 142.

In FIG. 1, the length direction of the solid electrolytic capacitor 1 or the capacitor element laminate 100 is indicated by L, the width direction thereof is indicated by W, and the thickness direction thereof is indicated by T. Here, the length direction L, the width direction W, and the thickness direction T are perpendicular to each other. A plane along the length direction L and the thickness direction T of the solid electrolytic capacitor 1 or the capacitor element laminate 100 is referred to as an LT plane; a plane along the length direction L and the width direction W thereof is referred to as an LW plane; and a plane along the width direction W and the thickness direction T thereof is referred to as a WT plane.

The outer shape of the capacitor element laminate 100 is a rectangular parallelepiped. The capacitor element laminate 100 includes a first end surface E1 and a second end surface E2 opposite to each other in the length direction L, a first lateral surface S1 and a second lateral surface S2 opposite to each other in the width direction W, and a first main surface M1 and a second main surface M2 opposite to each other in the thickness direction T. The first end surface E1 and the second end surface E2 are WT planes, the first lateral surface S1 and the second lateral surface S2 are LT planes, and the first main surface M1 and the second main surface M2 are LW planes. In the present embodiment, the second main surface M2 is a bottom of the capacitor element laminate 100, and is a side that defines a mounting surface of the solid electrolytic capacitor 1.

In the capacitor element laminate 100, corners and edges may be rounded. The corner is a portion where three surfaces of the capacitor element laminate 100 meet, and the edge is a portion where two surfaces of the capacitor element laminate 100 meet.

The first external electrode 141 is provided at the first end surface E1 of the capacitor element laminate 100. In the present embodiment, the first external electrode 141 extends to a portion of the first main surface M1, a portion of the second main surface M2, a portion of the first lateral surface S1, and a portion of the second lateral surface S2 of the capacitor element laminate 100. The first external electrode 141 may not extend to a portion of the first main surface M1 of the capacitor element laminate 100. For example, the first external electrode 141 provided at the first end surface E1 may extend to a portion of the second main surface M2.

The second external electrode 142 is provided at the second end surface E2 of the capacitor element laminate 100. In the present embodiment, the second external electrode 142 extends to a portion of the first main surface M1, a portion of the second main surface M2, a portion of the first lateral surface S1, and a portion of the second lateral surface S2 of the capacitor element laminate 100. The second external electrode 142 may not extend to a portion of the first main surface M1 of the capacitor element laminate 100. For example, the second external electrode 142 provided at the second end surface E2 may extend to a portion of the second main surface M2.

Figure 2:
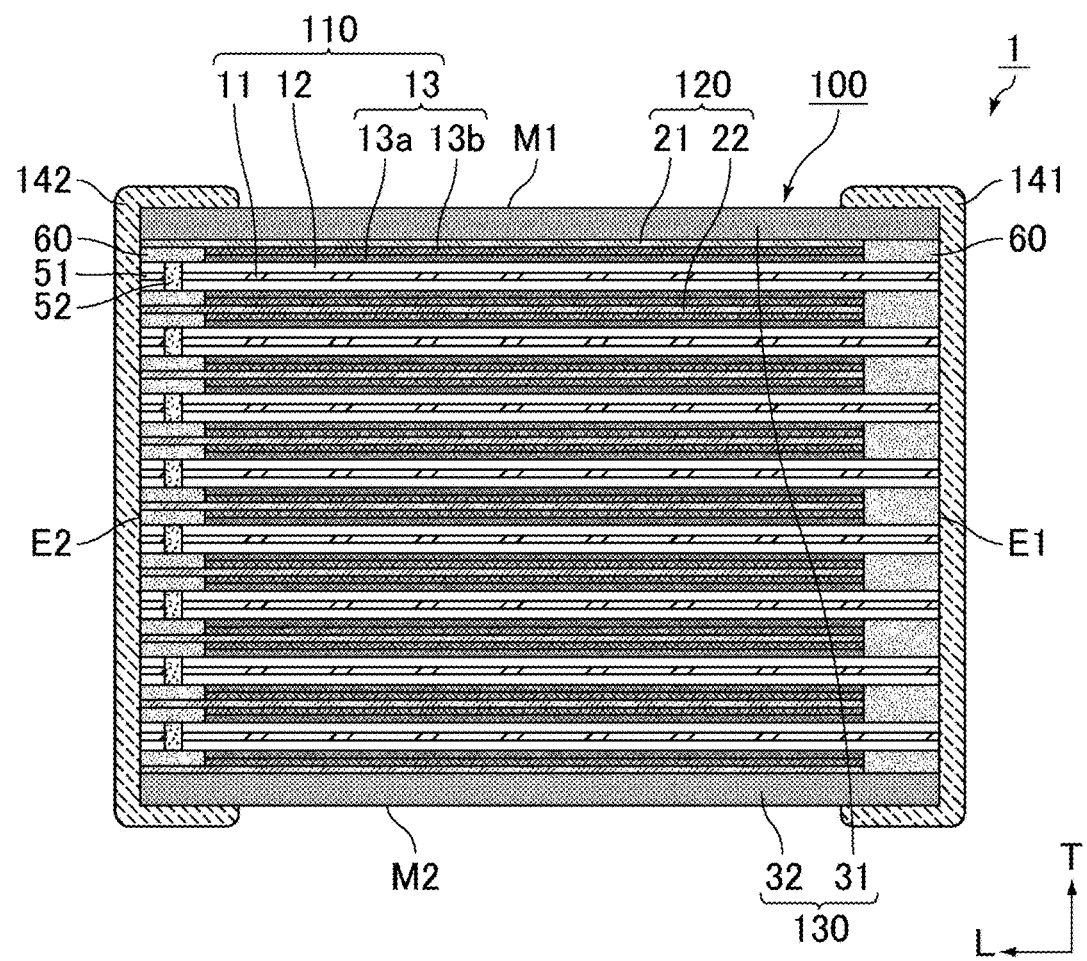
FIG. 2 is a cross-sectional view taken along the line II-II of the solid electrolytic capacitor shown in FIG. 1.
Figure 3:
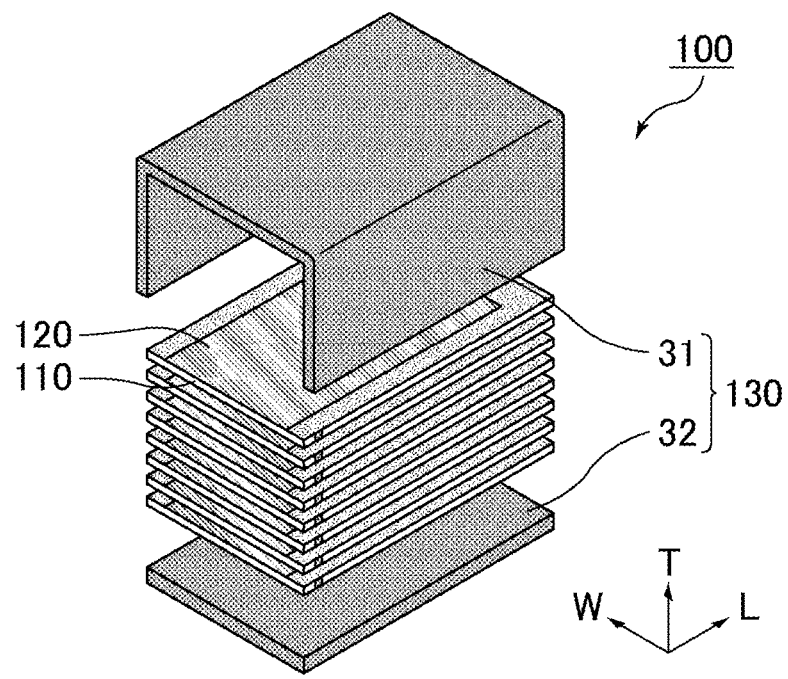
FIG. 3 is an exploded perspective view of a capacitor element laminate defining the solid electrolytic capacitor shown in FIG. 1.

FIG. 2 is a cross-sectional view taken along the line II-II of the solid electrolytic capacitor shown in FIG. 1. FIG. 2 is an LT cross-sectional view of the solid electrolytic capacitor 1. FIG. 3 is an exploded perspective view of a capacitor element laminate defining the solid electrolytic capacitor shown in FIG. 1.

As shown in FIG. 2 and FIG. 3, the capacitor element laminate 100 includes capacitor elements 110, cathode lead-out layers 120, and a sealing body 130. In FIG. 2 and FIG. 3, the capacitor elements 110 and the cathode lead-out layers 120 are stacked in the thickness direction T. The sealing body 130 encloses the capacitor elements 110 and the cathode lead-out layers 120.

Each capacitor element 110 includes an anode foil 11, a dielectric layer 12, and a cathode layer 13. The cathode layers 13 of the capacitor element 110 are connected to the respective cathode lead-out layers 120.

The anode foil 11 includes a core portion and a porous portion on a surface of the core portion. The anode foil 11 includes the dielectric layer 12 on a surface of the porous portion. Preferably, the anode foil 11 includes a porous portion on both surfaces of the core portion.

The anode foil 11 is made of a valve-action metal that functions as a valve. Examples of the valve-action metal include elemental metals such as aluminum, tantalum, niobium, titanium, zirconium, and alloys containing at least one of these metals. Of these, aluminum and an aluminum alloy are preferred.

The porous portion of the anode foil 11 may be an etched layer formed on a surface of the anode foil 11, or a porous layer printed and sintered on the surface of the anode foil 11. When the valve-action metal is aluminum or an aluminum alloy, an etched layer can be formed on the surface by etching with hydrochloric acid or the like.

The thickness of the anode foil 11 before etching is preferably 60 μm to 200 μm. The thickness of the non-etched core portion after etching is preferably 15 μm to 70 μm. The thickness of the porous portion is designed according to the withstand voltage and capacitance required. Yet, the total thickness of the porous portions on both sides of the core portion is preferably 10 μm to 180 μm.

The dielectric layer 12 is provided on the surface of the porous portion of the anode foil 11. The dielectric layer 12 is formed along the surface of the porous portion, and thus includes pores (recesses).

The dielectric layer 12 is preferably made of an oxide film of the valve-action metal. For example, when an aluminum foil is used as the anode foil 11, the surface of the aluminum foil is anodized (chemically treated) in an aqueous solution containing ammonium adipate or the like, whereby the dielectric layer 12 made of an oxide film can be formed.

The thickness of the dielectric layer 12 is designed according to the withstand voltage and capacitance required, but it is preferably 10 nm to 100 nm.

The cathode layer 13 is provided on the surface of the dielectric layer 12. The cathode layer 13 includes a solid electrolyte layer 13a on the surface of the dielectric layer 12. Preferably, the cathode layer 13 further includes a carbon layer 13b on a surface of the solid electrolyte layer 13a.

Examples of materials of the solid electrolyte layer 13a include conductive polymers such as polypyrroles, polythiophenes, and polyanilines. Of these, polythiophenes are preferred, and poly(3,4-ethylenedioxythiophene) (PEDOT) is particularly preferred. Examples of the conductive polymers may also include dopants such as poly(styrene sulfonate) (PSS).

The solid electrolyte layer 13a is formed by, for example, a method in which a treatment solution containing a monomer such as 3,4-ethylenedioxythiophene is used to form a polymerized film of poly(3,4-ethylenedioxythiophene) or the like on the surface of the dielectric layer 12, or a method in which a dispersion of a polymer such as poly(3,4-ethylenedioxythiophene) is applied to the surface of the dielectric layer 12 and drying the dispersion. Preferably, the solid electrolyte layer 13a is formed by first forming an inner layer filling the pores (recesses) in the dielectric layer 12 and then forming an external layer covering the dielectric layer 12.

The solid electrolyte layer 13a can be formed in a predetermined region by applying the treatment solution or dispersion to the dielectric layer 12 by, for example, sponge transfer, screen printing, inkjet printing, or using a dispenser. The thickness of the solid electrolyte layer 13a is preferably 2 μm to 20 μm.

The carbon layer 13b is provided to electrically and mechanically interconnect the solid electrolyte layer 13a and the cathode lead-out layer 120.

The carbon layer 13b can be formed in a predetermined region by applying a carbon paste to the solid electrolyte layer 13a by, for example, sponge transfer, screen printing, inkjet printing, or using a dispenser. Preferably, the cathode lead-out layers 120 in the subsequent step are stacked while the carbon layer 13b is viscous before drying. The thickness of the carbon layer 13b is preferably 2 μm to 20 μm.

Preferably, each cathode lead-out layer 120 is a printed electrode layer.

The printed electrode layer can be formed in predetermined region by applying an electrode paste to the cathode layer 13 by, for example, sponge transfer, screen printing, inkjet printing, or using a dispenser. The electrode paste is preferably a conductive paste mainly containing silver, copper, or nickel. In the case of screen printing, a printed electrode layer having a thickness of 2 μm to 20 μm can be made.

Each cathode lead-out layer 120 may be made of a metal foil.

Preferably, the metal foil is at least one metal selected from the group consisting of aluminum, copper, silver, and an alloy mainly containing at least one of these metals. The metal foil may be one whose surface is coated with carbon or titanium by a film forming method such as sputtering or deposition. In particular, use of carbon-coated aluminum foil is preferred. The thickness of the metal foil is not limited, but is preferably 20 μm to 50 μm in order to reduce the size and the equivalent series resistance (ESR).

Preferably, the cathode lead-out layer 120 includes a first cathode lead-out layer 21 on an upper surface of the capacitor element 110 and a second cathode lead-out layer 22 on a lower surface of the capacitor element 110. In this case, the first cathode lead-out layer 21 and the second cathode lead-out layer 22 are separately provided in one capacitor element 110, and are not connected to each other. At an outermost surface in the thickness direction T (i.e., an outermost surface parallel to the LW plane), the first cathode lead-out layer 21 or the second cathode lead-out layer 22 faces the sealing body 130.

In the example shown in FIG. 2, a metal foil 51 exposed at the second end surface E2 of the capacitor element laminate 100 is provided in a space where the capacitor elements 110 is not present between the first cathode lead-out layer 21 and the second cathode lead-out layer 22.

An insulating layer or a resin molded body may fill the space where the capacitor element 110 is not present between the first cathode lead-out layer 21 and the second cathode lead-out layer 22.

The metal foil 51 is a portion separated from the anode foil 11 by a slit SL1 described later (see FIG. 8), and is completely insulated from the anode foil 11. The metal foil 51 is electrically insulated from the anode foil 11, but these are originally the same layer. Thus, the metal foil 51 includes the dielectric layer 12 on the surface.

Preferably, an insulating portion 52 filling the slit SL1 is provided between the metal foil 51 and the anode foil 11. An insulating material of the insulating portion 52 includes at least a resin, preferably a resin and a filler. Examples of the resin include epoxy resins and phenol resins. Examples of the filler include silica particles, alumina particles, and metal particles.

Insulating layers 60 are provided between the first cathode lead-out layer 21 and the metal foil 51 and between the second cathode lead-out layer 22 and the metal foil 51. The insulating layers 60 are also provided between the capacitor elements 110. Further, the insulating layers 60 are provided between the capacitor element 110 and the sealing body 130 defining the first main surface M1 of the capacitor element laminate 100, and between the capacitor element 110 and the sealing body 130 defining the second main surface M2 of the capacitor element laminate 100. Each insulating layer 60 may include a single layer or multiple layers. For example, each insulating layer 60 includes a mask layer 61 described later (see FIG. 9) and an insulating adhesive layer 62 on a surface of the mask layer 61 (see FIG. 13). The insulating layers 60 may not be provided at the portions described above, or resin molded bodies instead of the insulating layers 60 may be provided at the portions described above.

The mask layer 61 is formed by, for example, applying a masking material made of an insulating material such as an insulating resin to the surface of the anode foil 11 and solidifying or curing the masking material by heat or the like. The masking material is preferably applied by, for example, screen printing, inkjet printing, or using a dispenser.

Examples of the insulating material of the masking material include insulating resins such as polyphenylsulfone resin, polyethersulfone resin, cyanate ester resin, fluorine resins (e.g., tetrafluoroethylene and tetrafluoroethylene-perfluoroalkyl vinyl ether copolymer), compositions containing a soluble polyimide siloxane and an epoxy resin, polyimide resin, polyamideimide resin, and derivatives or precursors thereof.

The insulating adhesive layer 62 is formed by, for example, applying an insulating material such as an insulating resin to the mask layer 61 and solidifying or curing the masking material by heat or the like. The insulating material is preferably applied by, for example, screen printing, inkjet printing, or using a dispenser.

Components and the viscosity of the insulating adhesive layer 62 may be the same as those of the mask layer 61, but are preferably different from those of the mask layer 61.

The capacitor elements 110 and the cathode lead-out layers 120 are enclosed in the sealing body 130. As shown in FIG. 2 and FIG. 3, the sealing body 130 includes a first resin molded body 31 and a second resin molded body 32.

The first resin molded body 31 and the second resin molded body 32 are made of the same insulating material. The insulating material of the first resin molded body 31 and the second resin molded body includes at least a resin, preferably a resin and a filler. Examples of the resin include epoxy resins and phenol resins. Examples of the filler include silica particles, alumina particles, and metal particles.

The first resin molded body 31 and the second resin molded body 32 can be formed by a method that uses a resin mold such as a compression mold or a transfer mold. For example, a compression mold is used to enclose a stack of the capacitor elements 110 and the cathode lead-out layers 120 from the upper and lower sides, whereby the first resin molded body 31 and the second resin molded body 32 are formed. In this case, the capacitor element laminate 100 can have a vertically symmetric structure in the LT cross section of the solid electrolytic capacitor 1 shown in FIG. 2.

Figure 4A:
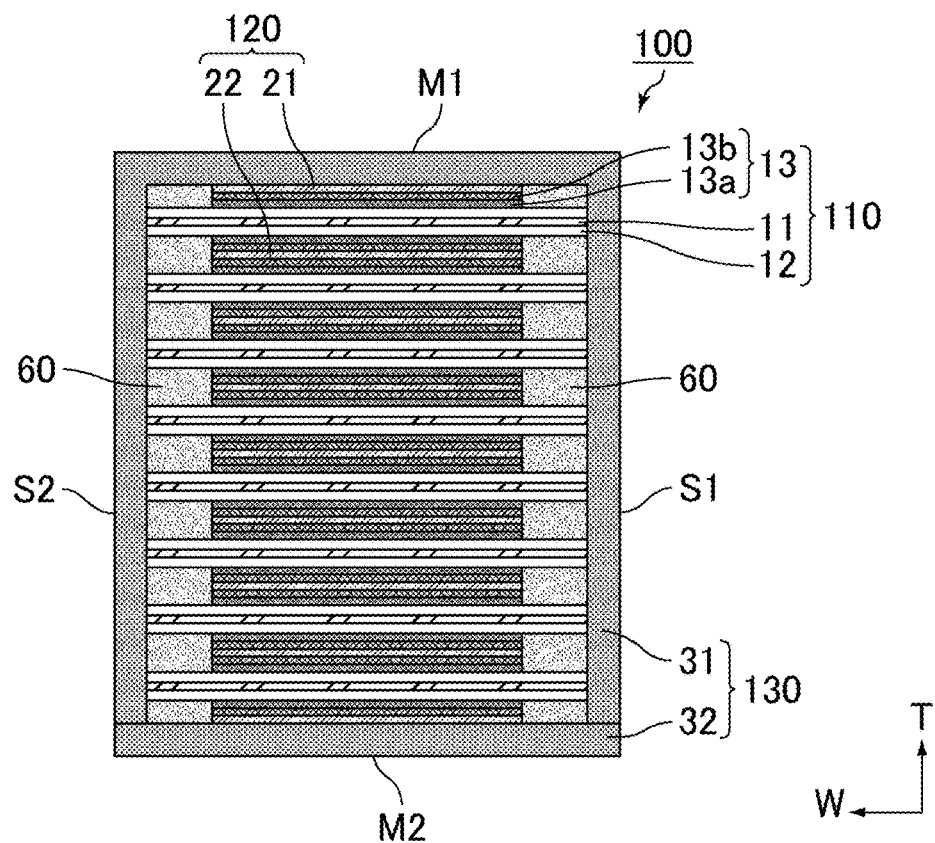
FIG. 4A is a plan view of the capacitor element laminate shown in FIG. 3 viewed from a second end surface.
Figure 4B:
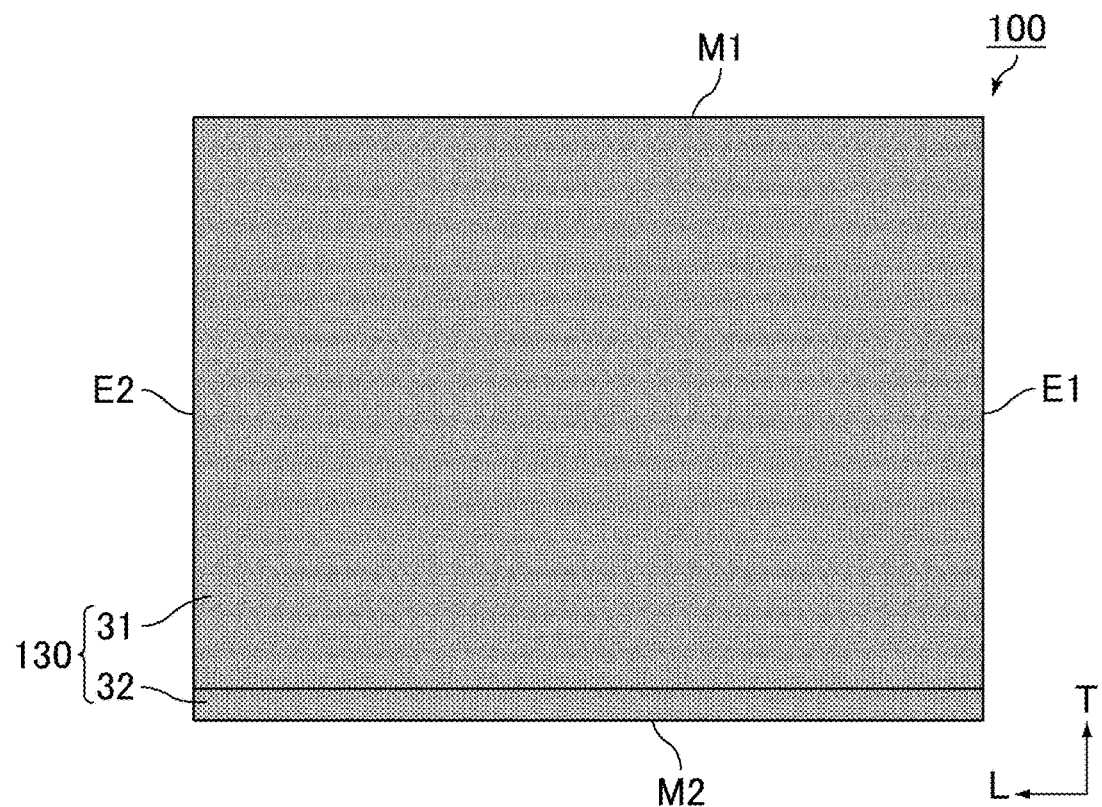
FIG. 4B is a plan view of the capacitor element laminate shown in FIG. 3 viewed from a first lateral surface.

FIG. 4A is a plan view of the capacitor element laminate shown in FIG. 3 viewed from the second end surface. FIG. 4B is a plan view of the capacitor element laminate shown in FIG. 3 viewed from the first lateral surface.

In examples shown in FIG. 4A and FIG. 4B, the sealing body 130 includes only the first resin molded body 31 and the second resin molded body 32. The first resin molded body 31 defines the first main surface M1, the first lateral surface S1, and the second lateral surface S2 of the capacitor element laminate 100, and the second resin molded body 32 defines the second main surface M2 of the capacitor element laminate 100.

As shown in FIG. 4A and FIG. 4B, preferably, the interface between the first resin molded body 31 and the second resin molded body 32 is parallel to the first main surface M1 and the second main surface M2 of the capacitor element laminate 100.

While the position of the interface between the first resin molded body 31 and the second resin molded body 32 is not limited, preferably, the first lateral surface S1 and the second lateral surface S2 of the capacitor element laminate 100 are uniformly covered with the resin in order to minimize the impact of cracking if it occurs from the interface on the capacitor elements 110. Thus, as shown in FIG. 4A, preferably, the interface between the first resin molded body 31 and the second resin molded body 32 is flush with the surface of the cathode lead-out layer 120 on the lower surface of the capacitor element 110 closest to the second main surface M2 of the capacitor element laminate 100.

The expression "flush with" does not necessarily mean that the interface between the first resin molded body 31 and the second resin molded body 32 is precisely flush with the surface of the cathode lead-out layer 120. For example, the interface may be vertically shifted by about 50 μm relative to the surface of the cathode lead-out layer 120.

Figure 5A:
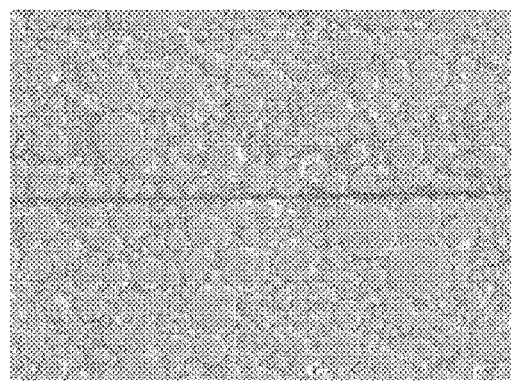
FIG. 5A and FIG. 5B are each an electron micrograph of a portion including an interface between a first resin molded body and a second resin molded body.
Figure 5B:
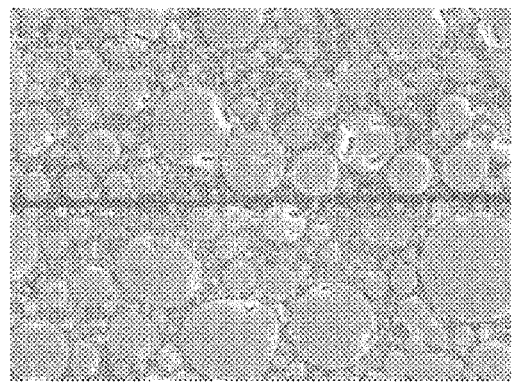

FIG. 5A and FIG. 5B are each an electron micrograph of a portion including an interface between the first resin molded body and the second resin molded body.

FIG. 5A and FIG. 5B each show filler defining the first resin molded body and the second resin molded body. It is clear from FIG. 5A and FIG. 5B that there is no filler crossing over the interface between the first resin molded body and the second resin molded body.

Figure 6A:
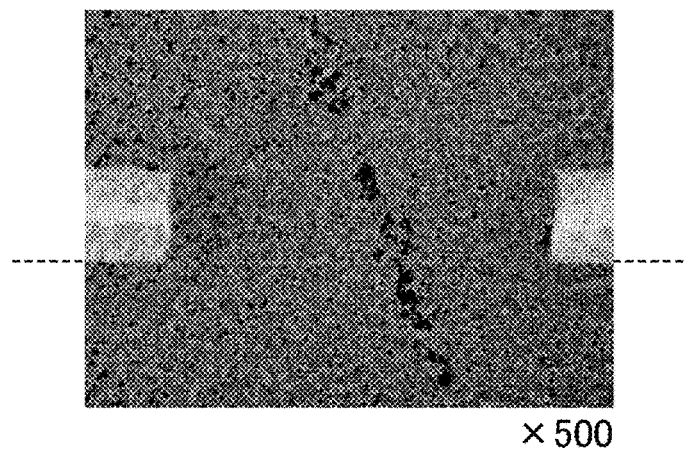
FIG. 6A and FIG. 6B are each an optical micrograph of a portion including an interface between the first resin molded body and the second resin molded body.
Figure 6B:
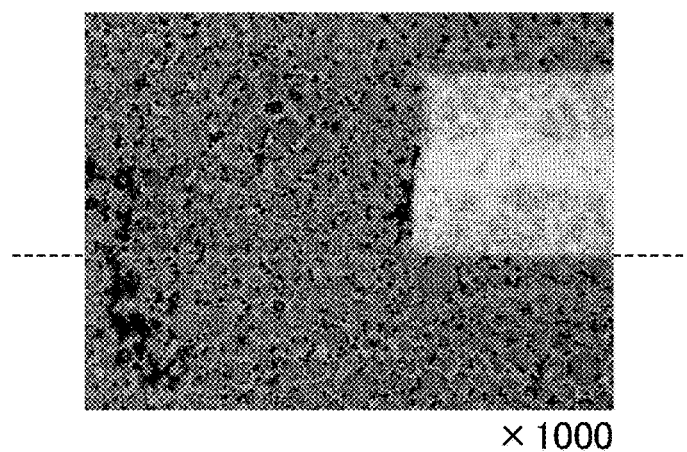

FIG. 6A and FIG. 6B are each an optical micrograph of a portion including an interface between the first resin molded body and the second resin molded body.

It is clear from FIG. 6A and FIG. 6B that the interface between the first resin molded body and the second resin molded body can also be confirmed by using an optical microscope.

While the embodiment is not limited to the example shown in FIG. 4A and FIG. 4B, preferably, the interface between the first resin molded body 31 and the second resin molded body 32 is flush with the surface of the insulating layer 60 closest to the second main surface M2 of the capacitor element laminate 100. When the insulating layer 60 includes the insulating adhesive layer 62, preferably, the interface between the first resin molded body 31 and the second resin molded body 32 is flush with the surface of the insulating adhesive layer 62 closest to the second main surface M2 of the capacitor element laminate 100.

As described above, the expression "flush with" does not necessarily mean that the interface between the first resin molded body 31 and the second resin molded body 32 is precisely flush with the surface of the insulating layer 60 or the insulating adhesive layer 62. For example, the interface may be vertically shifted by about 50 μm relative to the surface of the insulating layer 60 or the insulating adhesive layer 62.

The first resin molded body 31 may only have to enclose the capacitor elements 110 and the cathode lead-out layers 120 from the first main surface M1 of the capacitor element laminate 100 so as to define at least the first main surface M1. The second resin molded body 32 may only have to enclose the capacitor elements 110 and the cathode lead-out layers 120 from the second main surface M2 of the capacitor element laminate 100 so as to define at least the second main surface M2. Thus, the sealing body 130 may include another resin molded body, in addition to the first resin molded body 31 and the second resin molded body 32.

The first external electrode 141 is connected to the anode foil 11 exposed at the first end surface E1 of the capacitor element laminate 100.

The second external electrode 142 is connected to the cathode lead-out layers 120 exposed at the second end surface E2 of the capacitor element laminate 100.

The first external electrode 141 and the second external electrode 142 can be formed by, for example, plating, sputtering, immersion coating, or printing. In the case of plating, a plating layer may be, for example, a Zn.Ag.Ni layer, a Ag.Ni layer, a Ni layer, a Zn.Ni.Au layer, a Ni.Au layer, a Zn.Ni.Cu layer, or a Ni.Cu layer. Preferably, additional plating layers including a Cu plating layer, a Ni plating layer, and a Sn plating layer in the stated order (or without one or some of these layers) are formed on the above plating layers.

Method of Producing Solid Electrolytic Capacitor

The following describes an example of a method of producing the solid electrolytic capacitor of the present invention. Each step of the method is described. In the following example, a method of simultaneously producing multiple solid electrolytic capacitors by using a large electrode sheet is described.

(A) Preparing Electrode Sheet

In step (A), an electrode sheet including a dielectric layer on a surface is prepared.

Figure 7:
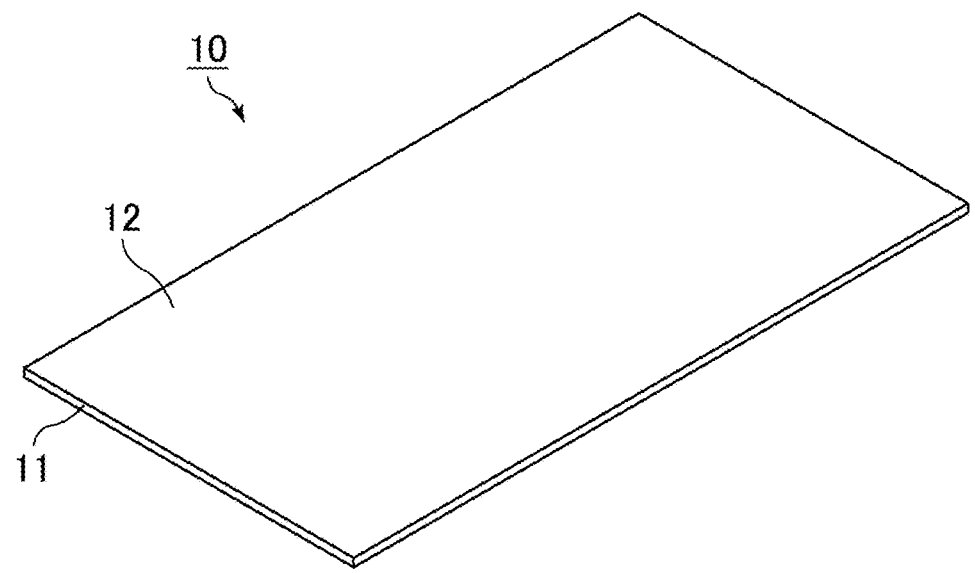
FIG. 7 is a schematic perspective view of an example of an electrode sheet.

FIG. 7 is a schematic perspective view of an example of the electrode sheet.

An electrode sheet 10 shown in FIG. 7 is made of the anode foil 11 including the dielectric layer 12 on a surface.

The electrode sheet 10 is preferably produced as follows.

First, the anode foil 11 including a core portion and a porous portion on a surface of the core portion is prepared, and the dielectric layer 12 is formed on a surface of the porous portion.

In order to improve the production efficiency, a chemically treated foil that has been subjected to chemical treatment may be used as the anode foil 11 having the dielectric layer 12 on the surface.

(B) Forming Slits in Electrode Sheet

In step (B), slits are formed in the electrode sheet to separate a metal foil that defines cathode exposed portions from the anode foil.

Figure 8:
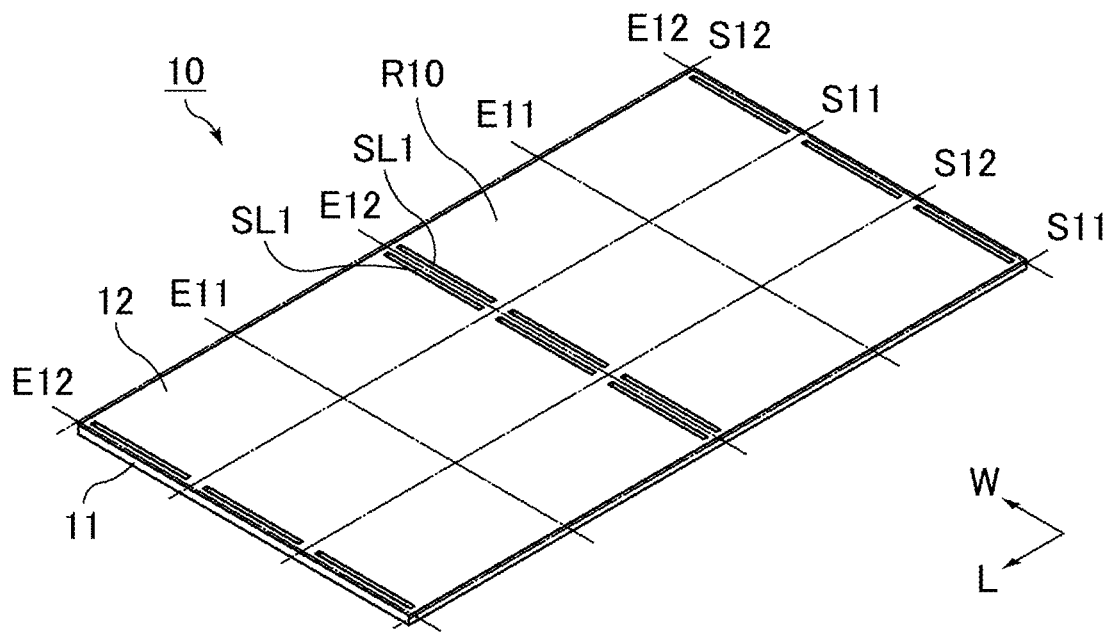
FIG. 8 is a schematic perspective view of an example of the electrode sheet including slits.

FIG. 8 is a schematic perspective view of an example of the electrode sheet including the slits.

FIG. 8 shows multiple capacitor element regions R10 in the electrode sheet 10. The capacitor element regions R10 are regions divided by first end portions E11 and second end portions E12 which are opposite to each other in the length direction L, and first lateral portions S11 and second lateral portions S12 which are opposite to each other in the width direction W. Each capacitor element region R10 shares the first end portion E11 or the second end portion E12 with its adjacent capacitor element region R10 in the length direction L. Each capacitor element region R10 shares the first lateral portion S11 or the second lateral portion S12 with its adjacent capacitor element region R10 in the width direction W.

As shown in FIG. 8, the slit SL1 is formed in each capacitor element region R10 of the electrode sheet 10. The slits SL1 are formed near the second end portions E12 and are parallel to the second end portions E12. The width of each slit SL1 (dimension in the L direction) is, for example, 30 µm to 150 µm. The length of each slit SL1 (dimension in the W direction) is smaller than its dimension in the W direction of the capacitor element region R10.

(C) Forming Mask Layer

In step (C), a mask layer is formed to cover the end portions and lateral portions of each capacitor element region in the electrode sheet. Step (C) is an optional step.

Figure 9:
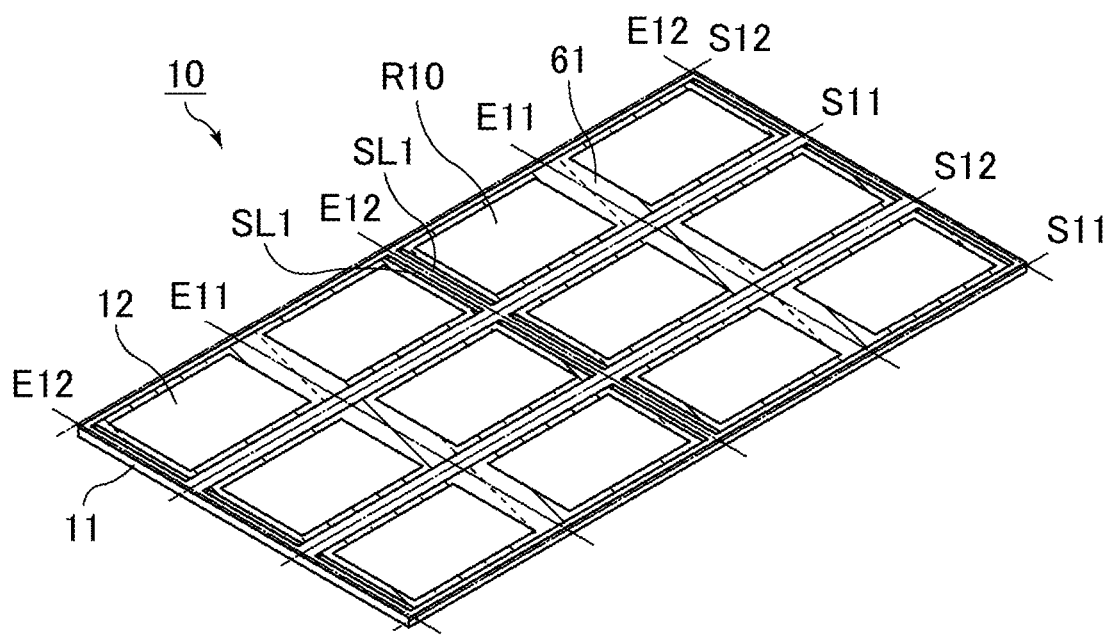
FIG. 9 is a schematic perspective view of an example of the electrode sheet including a mask layer.

FIG. 9 is a schematic perspective view of an example of the electrode sheet including the mask layer.

In the electrode sheet 10 shown in FIG. 9, the first end portion E11, the second end portion E12, the first lateral portion S11, and the second lateral portion S12 of each capacitor element region R10 are covered with the mask layer 61. In FIG. 9, some portions of the second end portion E12, the first lateral portion S11, and the second lateral portion S12 are not covered with the mask layer 61, but the mask layer 61 may be formed on these portions. The mask layer 61 may be formed on inner walls of the slits SL1.

(D) Forming Insulating Portions

In step (D), insulating portions are formed by filling the slits with an insulating material.

Figure 10:
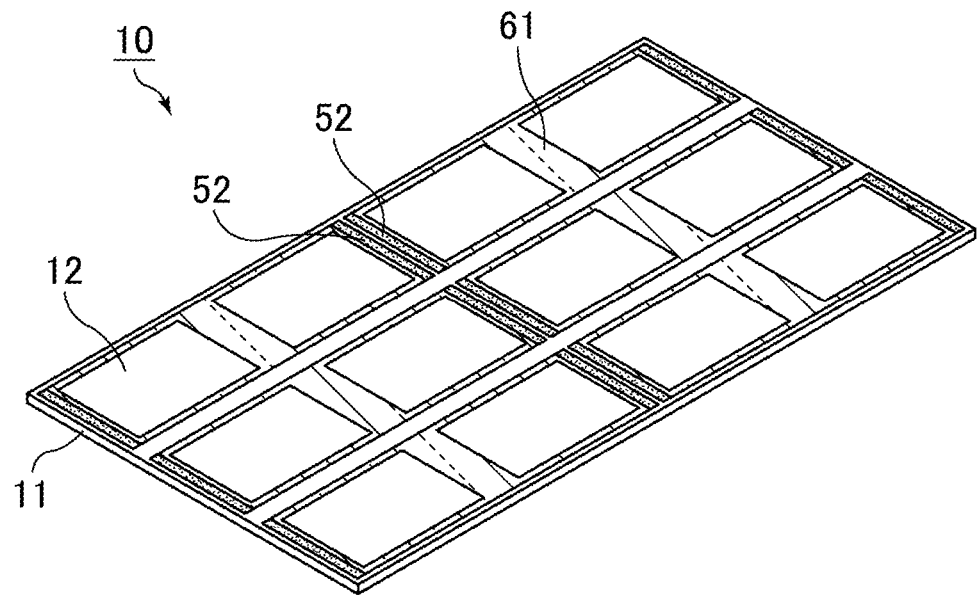
FIG. 10 is a schematic perspective view of an example of the electrode sheet including insulating portions.

FIG. 10 is a schematic perspective view of an example of the electrode sheet including the insulating portions.

In FIG. 10, the insulating portions 52 filling the slits SL1 are formed. The insulating portions 52 may be formed not only in the slits SL1 but may also be formed to extend on at least one of an upper surface or a lower surface of the electrode sheet 10. In this case, the insulating portions 52 may be connected to each other on the upper surface or the lower surface of the electrode sheet 10.

(E) Forming Cathode Layers

In step (E), a cathode layer is formed on a surface of each dielectric layer of the electrode sheet. In step (E), preferably, a solid electrolyte layer is first formed on the surface of each dielectric layer of the electrode sheet, and a carbon layer is then formed on a surface of each solid electrolyte layer.

Figure 11:
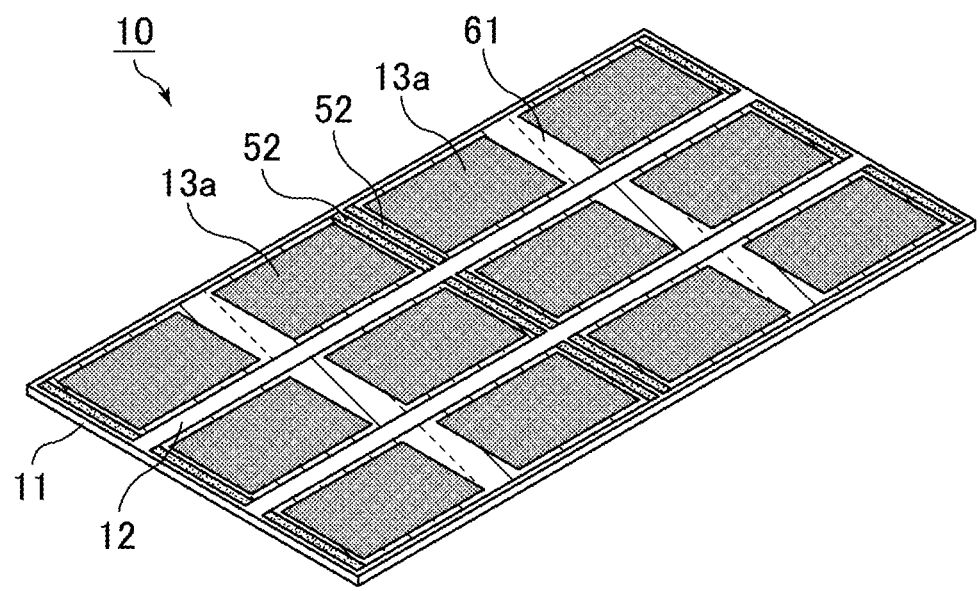
FIG. 11 is a schematic perspective view of an example of the electrode sheet including solid electrolyte layers.

FIG. 11 is a schematic perspective view of an example of the electrode sheet including the solid electrolyte layers.

In FIG. 11, each solid electrolyte layer 13a is formed in the region surrounded by the mask layer 61.

Figure 12:
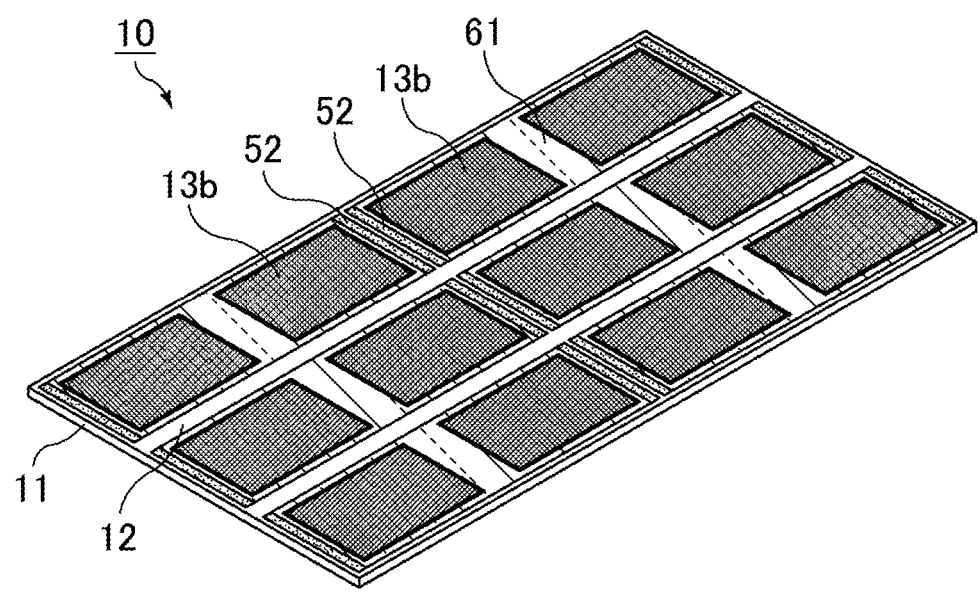
FIG. 12 is a schematic perspective view of an example of the electrode sheet including carbon layers.

FIG. 12 is a schematic perspective view of an example of the electrode sheet including the carbon layers.

In FIG. 12, the carbon layer 13b is formed on a surface of each solid electrolyte layer 13a. The solid electrolyte layer 13a and the carbon layer 13b together form the cathode layer 13 (see FIG. 2).

(F) Forming Insulating Adhesive Layers

In step (F), an insulating adhesive layer is formed. In the case where step (C) is performed, an insulating adhesive layer is formed on a surface of the mask layer. In the case where step (C) is not performed, an insulating adhesive layer is formed to cover the end portions and lateral portions of each capacitor element region in the electrode sheet. Step (F) is an optional step.

Figure 13:
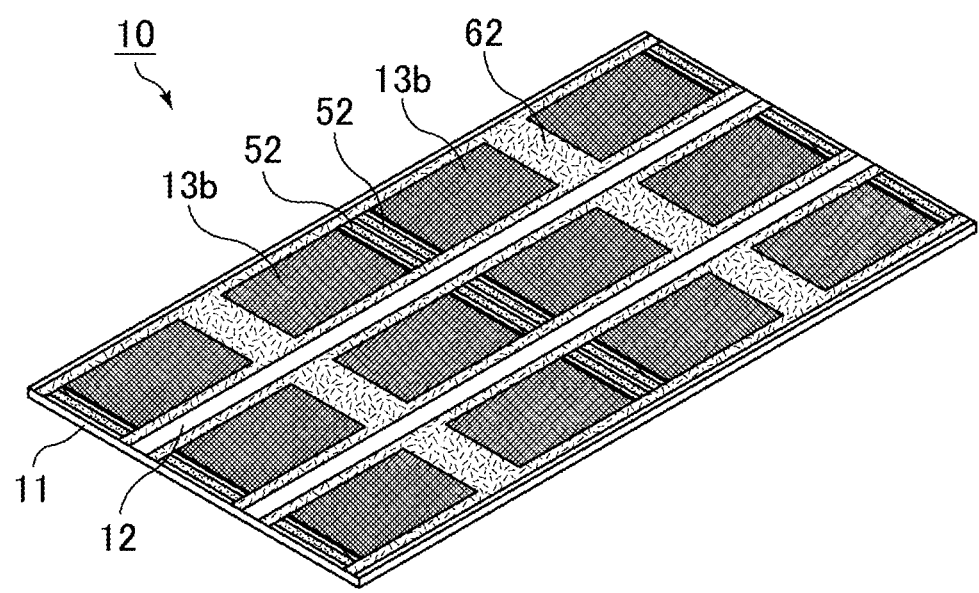
FIG. 13 is a schematic perspective view of an example of the electrode sheet including insulating adhesive layers.

FIG. 13 is a schematic perspective view of an example of the electrode sheet including the insulating adhesive layers.

In FIG. 13, the insulating adhesive layer 62 is formed on the surface of each mask layer 61. The mask layer 61 and the insulating adhesive layer 62 together form the insulating layer 60 (see FIG. 2).

The order of step (C), step (D), step (E), and step (F) is not limited.

The total thickness of the mask layer 61 and the insulating adhesive layer 62 may be the same as the thickness of the cathode layer 13, but is preferably greater than the thickness of the cathode layer 13.

(G) Forming Cathode Lead-Out Layers

In step (G), the cathode lead-out layers are formed by using a conductive paste. Preferably, the first cathode lead-out layer is formed on a surface of the cathode layer on the upper surface of the anode foil, and the second cathode lead-out layer is formed on a surface of the cathode layer on the lower surface of the anode foil.

Figure 14:
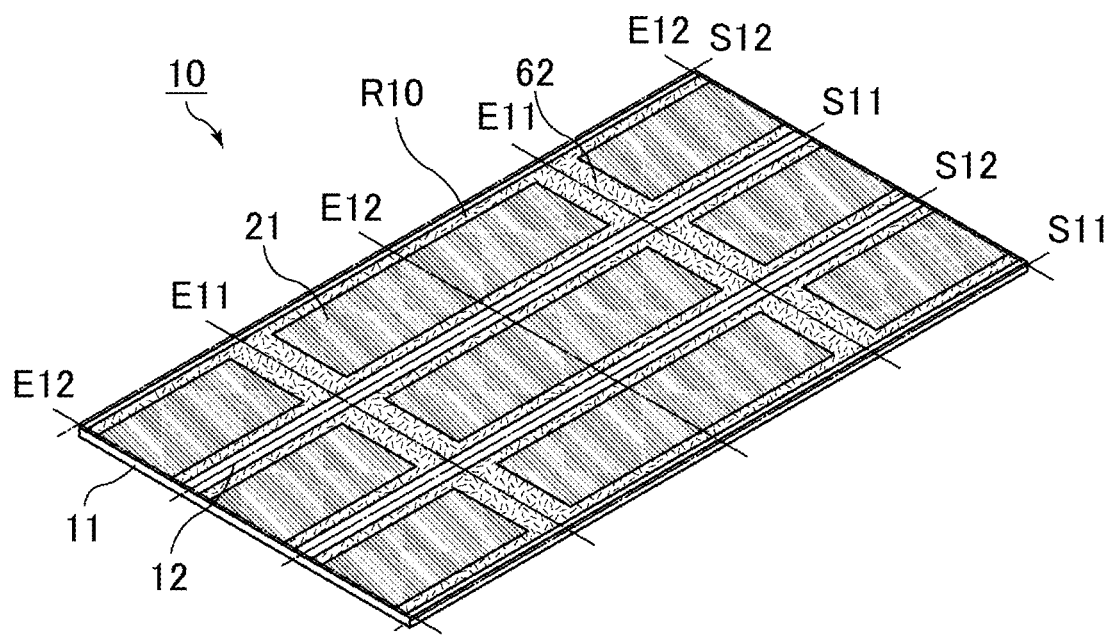
FIG. 14 is a schematic perspective view of an example of the electrode sheet including cathode lead-out layers.

FIG. 14 is a schematic perspective view of an example of the electrode sheet including cathode lead-out layers.

In FIG. 14, on the upper surface of the anode foil 11, each first cathode lead-out layer 21 is formed to bridge the carbon layers 13b across the second end portion E12 of each capacitor element region R10. Although not shown, similarly on the lower surface of the anode foil 11, each second cathode lead-out layer 22 is formed to bridge the carbon layers 13b across the second end portion E12 of each capacitor element region R10. The cathode lead-out layers 120 (see FIG. 2) are thus formed.

(H) Stacking Electrode Sheets and Enclosing

In step (H), the electrode sheets including the cathode lead-out layers are stacked to produce an electrode sheet laminate which is then enclosed, whereby a multilayer block body is produced.

The following describes an example of a method of producing the multilayer block body.

First, a slit is formed along each lateral portion of each capacitor element region of the electrode sheet.

Figure 15:
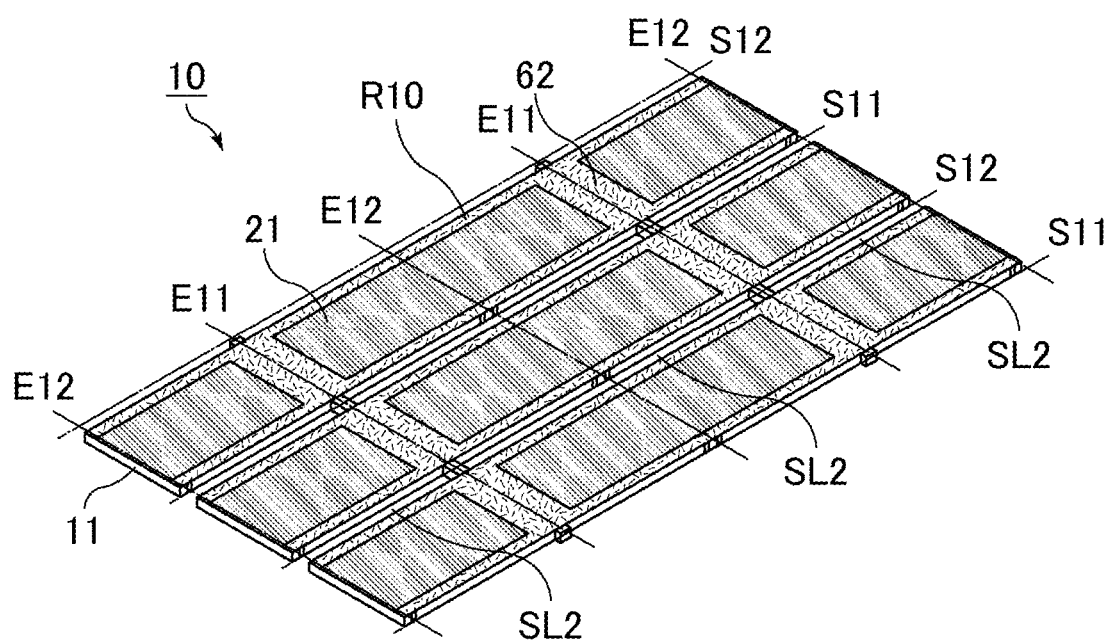
FIG. 15 is a schematic perspective view of an example of the electrode sheet including slits along lateral portions of the capacitor element regions.

FIG. 15 is a schematic perspective view of an example of the electrode sheet including the slits along lateral portions of each capacitor element region.

In FIG. 15, slits SL2 are formed along the lateral portion S11 and the second lateral portion S12 of each capacitor element region R10 of the electrode sheet 10. The slits SL2 are parallel to the first lateral portion S11 and the second lateral portion S12. In FIG. 15, each slit SL2 is provided at a portion where the insulating adhesive layer 62 is not provided, in such a manner that the slit SL2 crosses over the second end portion E12 of each capacitor element region R10. Each end of the slit SL2 does not reach the first end portion E11 of each capacitor element region R10.

The slits SL2 may be formed at any time as long as it is before laminating the electrode sheets. For example, the slit SL2 may be formed after the carbon layers 13b are formed, prior to forming the cathode lead-out layers 120.

Next, the electrode sheets are stacked.

When stacking the electrode sheets, preferably, another electrode sheet is provided on one electrode sheet while the cathode lead-out layer is viscous and wet. In other words, preferably, the electrode sheets are stacked together after the cathode lead-out layers are formed by using a conductive paste, prior to drying the conductive paste.

Figure 16:
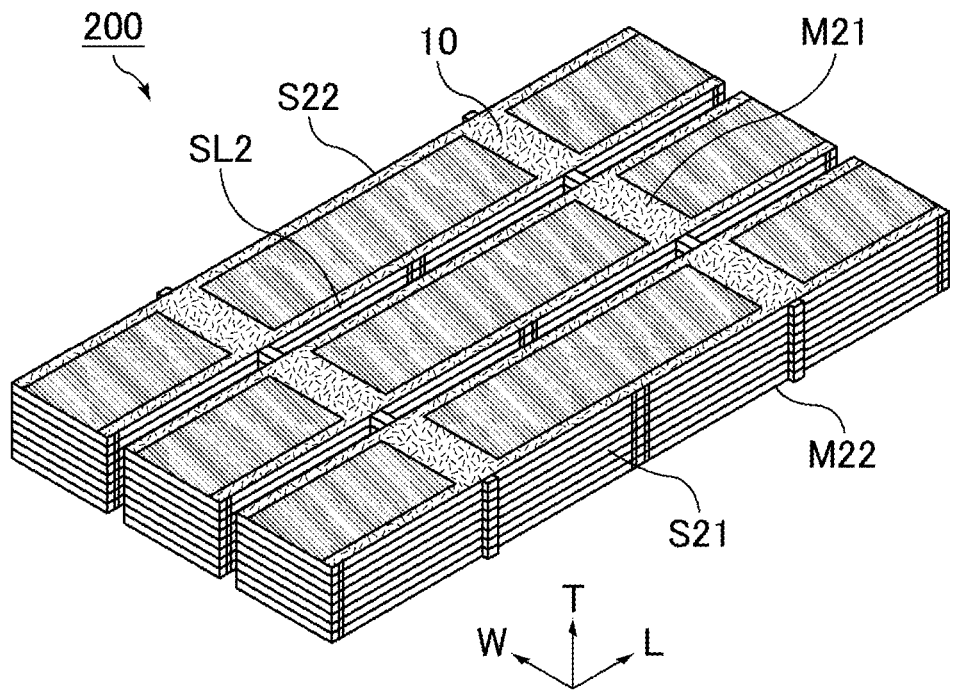
FIG. 16 is a schematic perspective view of an example of an electrode sheet laminate.

FIG. 16 is a schematic perspective view of an example of an electrode sheet laminate.

In FIG. 16, an electrode sheet laminate 200 is produced by stacking the multiple electrode sheets 10. In the electrode sheet laminate 200, the slits SL2 of the electrode sheets 10 are connected to each other in the thickness direction T. The electrode sheet laminate 200 includes a first lateral surface S21 and a second lateral surface S22 opposite to each other in the width direction W, and a first main surface M21 and a second main surface M22 opposite to each other in the thickness direction T.

Subsequently, a first sealing material is used to enclose the electrode sheet laminate from the first main surface. Then, a second sealing material is used to enclose the electrode sheet laminate from the second main surface. The first sealing material and the second sealing material are sealing materials made of the same insulating material. A multilayer block body is thus obtained.

The electrode sheet laminate can be enclosed by using the resin mold such as a compression mold described above.

A sealing material of the resin mold includes at least a resin, preferably a resin and a filler. Examples of the resin include epoxy resins and phenol resins. Examples of the filler include silica particles, alumina particles, and metal particles.

Figure 17:
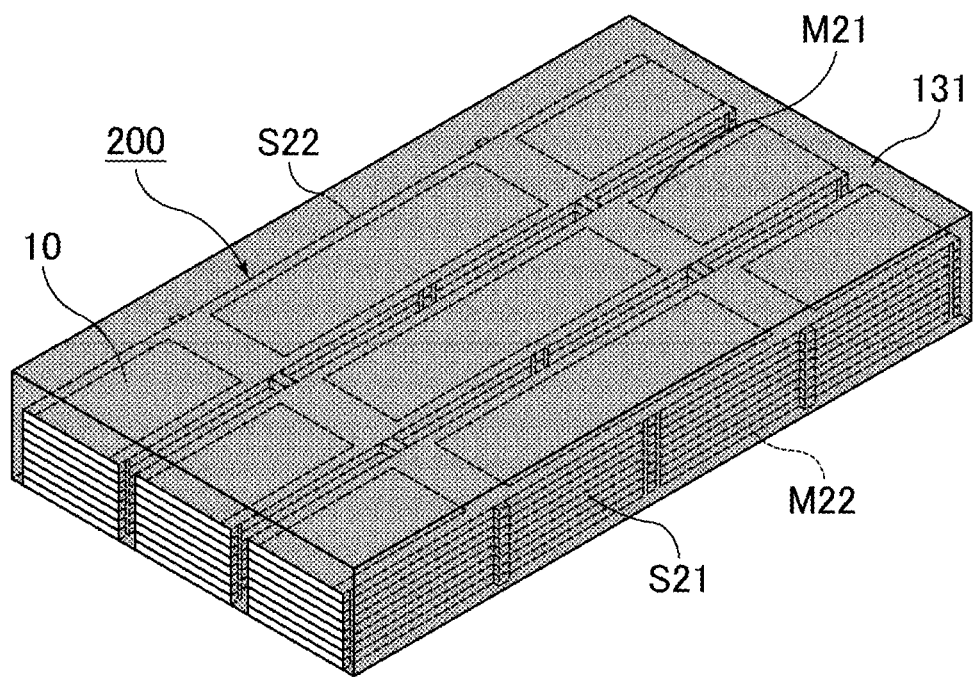
FIG. 17 is a schematic perspective view of an example of the electrode sheet laminate covered with a first sealing material.

FIG. 17 is a schematic perspective view of an example of the electrode sheet laminate covered with the first sealing material.

In FIG. 17, the first main surface M21, the first lateral surface S21, and the second lateral surface S22 of the electrode sheet laminate 200 shown in FIG. 16 are covered with a first sealing material 131. Further, the slits SL2 connected to each other in the thickness direction T are also filled with the first sealing material 131.

Figure 18:
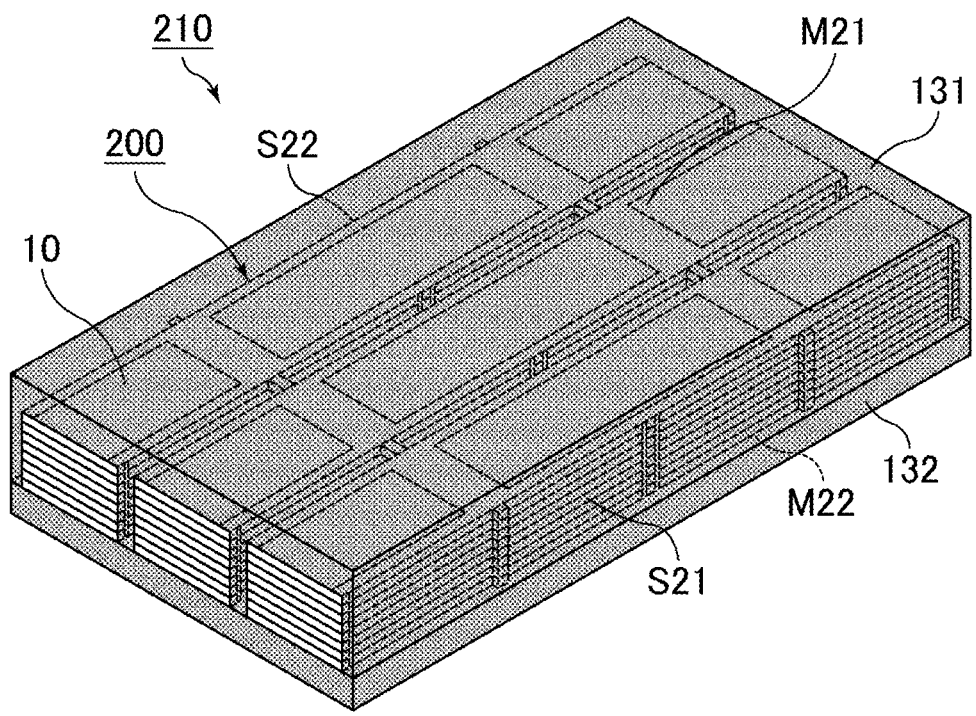
FIG. 18 is a schematic perspective view of an example of a multilayer block body.

FIG. 18 is a schematic perspective view of an example of the multilayer block body.

In FIG. 18, the second main surface M22 of the electrode sheet laminate 200 covered with the first sealing material 131 which is shown in FIG. 17 is covered with a second sealing material 132, whereby a multilayer block body 210 is produced.

(I) Cutting Multilayer Block Body to Produce Multiple Capacitor Element Laminates In step (I), the multilayer block body is cut to produce multiple capacitor element laminates.

Specifically, the multilayer block body is cut along the first end portion and the second end portion of each capacitor element region, and is also cut along the first lateral portion and the second lateral portion of each capacitor element region. Thereby, the individual capacitor element laminate 100 shown in FIG. 3 can be obtained. The multilayer block body is cut by, for example, dicing with a dicer, cutting using a cutting blade, laser cutting, or scribing.

Figure 19:
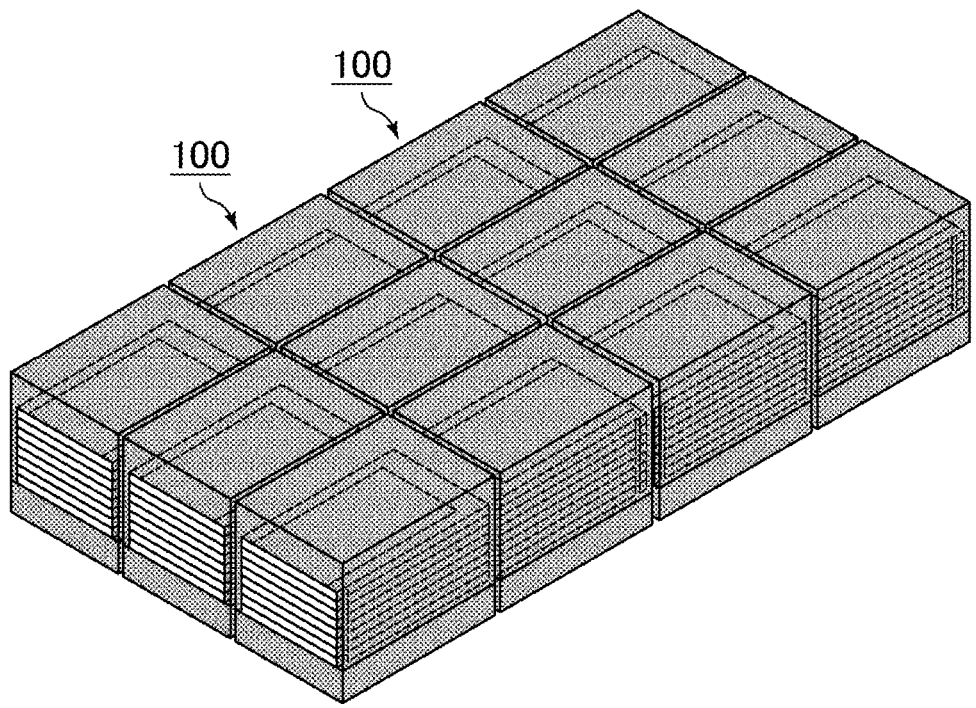
FIG. 19 is a schematic perspective view of an example of the capacitor element laminate cut into individual pieces.

FIG. 19 is a schematic perspective view of an example of the capacitor element laminate cut into individual pieces.

In FIG. 19, the multilayer block body 210 shown in FIG. 18 is cut to produce multiple capacitor element laminates 100.

The multilayer block body 210 is cut at a portion between the slits SL1 during cutting along the second end portion of each capacitor element region, whereby the capacitor element laminate 100 shown in FIG. 2 can be produced. The multilayer block body 210 may be cut on the slits SL1.

(J) Forming External Electrodes

A first external electrode is formed at a first end surface of the capacitor element laminate, and a second external electrode is formed at a second end surface of the capacitor element laminate. A solid electrolytic capacitor is thus produced.

The solid electrolytic capacitor of the present invention is not limited to the above embodiments, and various modifications and changes can be made to the structure of the solid electrolytic capacitor, production conditions, and the like within the scope of the present invention.

The methods of producing the multilayer block body, cutting the multilayer block body, and forming the external electrodes to produce the solid electrolytic capacitor of the present invention are not limited. Any methods other than those described above may be used.

REFERENCE SIGNS LIST 1 solid electrolytic capacitor
10 electrode sheet
11 anode foil
12 dielectric layer
13 cathode layer
13a solid electrolyte layer
13b carbon layer
21 first cathode lead-out layer
22 second cathode lead-out layer
31 first resin molded body
32 second resin molded body
51 metal foil
52 insulating portion
60 insulating layer
61 mask layer
62 insulating adhesive layer
100 capacitor element laminate
110 capacitor element
120 cathode lead-out layer
130 sealing body
131 first sealing material
132 second sealing material
141 first external electrode
142 second external electrode
200 electrode sheet laminate
210 multilayer block body
E1 first end surface of capacitor element laminate
E2 second end surface of capacitor element laminate
M1 first main surface of capacitor element laminate
M2 second main surface of capacitor element laminate
S1 first lateral surface of capacitor element laminate
S2 second lateral surface of capacitor element laminate
R10 capacitor element region
E11 first end portion of capacitor element region
E12 second end portion of capacitor element region
S11 first lateral portion of capacitor element region
S12 second lateral portion of capacitor element region
M21 first main surface of electrode sheet laminate
M22 second main surface of electrode sheet laminate
S21 first lateral surface of electrode sheet laminate
S22 second lateral surface of electrode sheet laminate
SL1, SL2 slit

The invention claimed is:

1. A solid electrolytic capacitor comprising:
   a capacitor element laminate having a first end surface and a second end surface, the capacitor element laminate having:
     at least one capacitor element that includes an anode foil made of a valve-action metal and exposed at the first end surface of the capacitor element laminate, a first dielectric layer on a first surface of the anode foil, a second dielectric layer on a second surface of the anode foil opposite the first surface, a first cathode layer including a first solid electrolyte layer on the first dielectric layer, and a second cathode layer including a second solid electrolyte layer on the second dielectric layer;
     a first cathode lead-out layer connected to the first cathode layer and exposed at the second end surface of the capacitor element laminate;
     a second cathode lead-out layer connected to the second cathode layer and exposed at the second end surface of the capacitor element laminate; and
     a sealing body that consists of a first resin molded body that encloses the capacitor element and the first and second cathode lead-out layers to define at least a first main surface of the capacitor element laminate, and a second resin molded body that encloses the capacitor element and the first and second cathode lead-out layers to define at least a second main surface of the capacitor element laminate, wherein the first resin molded body and the second resin molded body are made of the same insulating material, and an interface is present between the first resin molded body and the second resin molded body;
   a first external electrode connected to the anode foil that is exposed at the first end surface of the capacitor element laminate; and
   a second external electrode connected to the first and second cathode lead-out layers that are exposed at the second end surface of the capacitor element laminate.

2. The solid electrolytic capacitor according to claim 1, wherein the interface between the first resin molded body and the second resin molded body is flush with a surface of a stack of the capacitor element and the first and second cathode lead-out layers closest to the second main surface of the capacitor element laminate.

3. The solid electrolytic capacitor according to claim 1, wherein the first resin molded body defines the first main surface, a first lateral surface, and a second lateral surface of the capacitor element laminate, and
   the second resin molded body defines the second main surface of the capacitor element laminate.

4. The solid electrolytic capacitor according to claim 3, wherein the interface between the first resin molded body and the second resin molded body is flush with a surface of a cathode lead-out layer of the first and second cathode lead-out layers closest to the second main surface of the capacitor element laminate.

5. The solid electrolytic capacitor according to claim 3, further comprising:
   an insulating layer between the capacitor element and the sealing body and closest to the second main surface of the capacitor element laminate, and
   wherein the interface between the first resin molded body and the second resin molded body is flush with a surface of the insulating layer.

6. The solid electrolytic capacitor according to claim 1, wherein the interface between the first resin molded body and the second resin molded body is parallel to the first main surface and the second main surface of the capacitor element laminate.

7. The solid electrolytic capacitor according to claim 1, wherein an outer shape of the capacitor element laminate is a rectangular parallelepiped.

8. The solid electrolytic capacitor according to claim 1, wherein the insulating material of the first resin molded body and the second resin molded body includes at least a resin.

9. The solid electrolytic capacitor according to claim 8, wherein the insulating material of the first resin molded body and the second resin molded body further includes a filler.

10. The solid electrolytic capacitor according to claim 9, wherein the filler from the first resin molded body and the second resin molded body does not cross over the interface between the first resin molded body and the second resin molded body.

11. A solid electrolytic capacitor according to claim 1, comprising:
   a capacitor element laminate having a first end surface and a second end surface, the capacitor element laminate having:
      at least one capacitor element that includes an anode foil made of a valve-action metal and exposed at the first end surface of the capacitor element laminate, a first dielectric layer on a first surface of the anode foil, a second dielectric layer on a second surface of the anode foil opposite the first surface, a first cathode layer including a first solid electrolyte layer on the first dielectric layer, and a second cathode layer including a second solid electrolyte layer on the second dielectric layer;
      a first cathode lead-out layer connected to the first cathode layer and exposed at the second end surface of the capacitor element laminate;
      a second cathode lead-out layer connected to the second cathode layer and exposed at the second end surface of the capacitor element laminate; and
      a sealing body that includes a first resin molded body that encloses the capacitor element and the first and second cathode lead-out layers to define at least a first main surface of the capacitor element laminate, and a second resin molded body that encloses the capacitor element and the first and second cathode lead-out layers to define at least a second main surface of the capacitor element laminate, wherein the first resin molded body and the second resin molded body are made of the same insulating material;
   a first external electrode connected to the anode foil that is exposed at the first end surface of the capacitor element laminate; and
   a second external electrode connected to the first and second cathode lead-out layers that are exposed at the second end surface of the capacitor element laminate,
   wherein a metal foil exposed at the second end surface of the capacitor element laminate is in a space between the first cathode lead-out layer and the second cathode lead-out layer where the at least one capacitor element is not present, and
   the metal foil is a portion separated from the anode foil by a slit, and is completely insulated from the anode foil.

12. The solid electrolytic capacitor according to claim 11, further comprising:
   an insulating portion filling the slit between the metal foil and the anode foil.

13. The solid electrolytic capacitor according to claim 12, wherein the insulating portion extends to at least one of the first surface and the second surface of the anode foil.

14. The solid electrolytic capacitor according to claim 13, further comprising:
   an insulating layer between the at least one of the first surface and the second surface of the anode foil and the insulating portion extending to the at least one of the first surface and the second surface of the anode foil.

* * * * *